United States Patent [19]

Sato et al.

[11] 4,363,644

[45] Dec. 14, 1982

[54] FILTER FOR PURIFYING EXHAUST GAS

[75] Inventors: Susumu Sato, Okazaki; Yukihisa Takeuchi, Chita; Masahiro Tomita, Anjo, all of Japan

[73] Assignee: Nippon Soken, Inc., Nishio, Japan

[21] Appl. No.: 231,118

[22] Filed: Feb. 3, 1981

[30] Foreign Application Priority Data

| Feb. 4, 1980 | [JP] | Japan | 55-12881 |
| Jun. 20, 1980 | [JP] | Japan | 55-84198 |
| Jul. 15, 1980 | [JP] | Japan | 55-96583 |
| Jul. 21, 1980 | [JP] | Japan | 55-99639 |

[51] Int. Cl.$^3$ .................. B01D 39/20; C04B 21/06
[52] U.S. Cl. ........................................ 55/523; 55/524; 55/529; 55/DIG. 5; 55/DIG. 30; 210/510; 422/180; 60/311
[58] Field of Search .......... 55/523, 524, 529, DIG. 5, 55/DIG. 30; 210/510; 422/180; 252/477 R; 428/117, 118; 60/311

[56] References Cited

U.S. PATENT DOCUMENTS

| 2,506,244 | 5/1950 | Stopka | 55/523 |
| 3,022,187 | 2/1962 | Eyraud et al. | 55/523 |
| 3,048,537 | 8/1962 | Pall et al. | 210/510 |
| 3,502,596 | 3/1970 | Sowards | 55/523 |
| 4,054,702 | 10/1977 | Lundsager et al. | 422/180 |
| 4,106,913 | 8/1978 | Bunda et al. | 422/180 |
| 4,258,099 | 3/1981 | Narumiya | 210/510 |
| 4,265,659 | 5/1981 | Blome | 55/523 |
| 4,276,071 | 6/1981 | Outland | 55/523 |
| 4,281,512 | 8/1981 | Mills | 55/DIG. 30 |
| 4,299,600 | 11/1981 | Kobashi | 55/DIG. 30 |

FOREIGN PATENT DOCUMENTS 2517380  10/1976  Fed. Rep. of Germany ... 55/DIG. 5

*Primary Examiner*—David L. Lacey
*Attorney, Agent, or Firm*—Cushman, Darby & Cushman

[57] ABSTRACT

A filter for purifying exhaust gas of an automobile or the like comprises a rigid ceramic supporting member provided with at least one flow passage and porous ceramic filtering material which is charged within the passage and sintered to the walls so as to be integrally connected to the supporting member. This filter shows excellent exhaust gas purifying efficiency as well as high mechanical strength.

6 Claims, 8 Drawing Figures

FILTER FOR PURIFYING EXHAUST GAS

BACKGROUND OF THE INVENTION

The present invention relates to a filter for purifying exhaust gas and the like which are discharged from an internal combustion engine of an automobile or the like.

Conventionally, a ceramic honeycomb structure carrying oxidizing catalyst has been employed for such purpose. When such a ceramic honeycomb structure carrying oxidizing catalyst is disposed within the exhaust gas system of the automobile, open passages of the honeycomb structure extend in the same direction as the flowing direction of the exhaust gas. Therefore, most of the exhaust gas flows through the open passages of the honeycomb structure in a straight line without impinging against the walls of the open passages. As a result, fine carbon particles contained within the exhaust gas are not sufficiently contacted with the oxidizing catalyst so that the exhaust gas purifying efficiency is low.

And also a porous ceramic body conventionally is used as a filter for purifying exhaust gas. Since open passages of this filter extend in various directions and the contact area with the exhaust gas is large, the purifying efficiency is high. But mechanical strength against vibrations or the like is remarkably inferior to that of the filter composed of the ceramic honeycomb structure.

Accordingly, one object of the present invention is to provide a filter for exhaust gas having excellent mechanical strength, and wherein fine particles within the exhaust gas will be filtered out with high efficiency.

Another object of the present invention is to provide a filter for purifying exhaust gas wherein a porous ceramic filtering material is integrally retained by a ceramic supporting member.

Still another object of the present invention is to provide a filter for purifying exhaust gas, which is suitable to catch and collect fine carbon particles contained within the exhaust gas of a diesel engine.

DESCRIPTION OF THE DRAWINGS

Other objects and advantages of the invention will become apparent from the following description of embodiments with reference to the accompanying drawings wherein.

SUMMARY OF THE INVENTION

Figure 1:
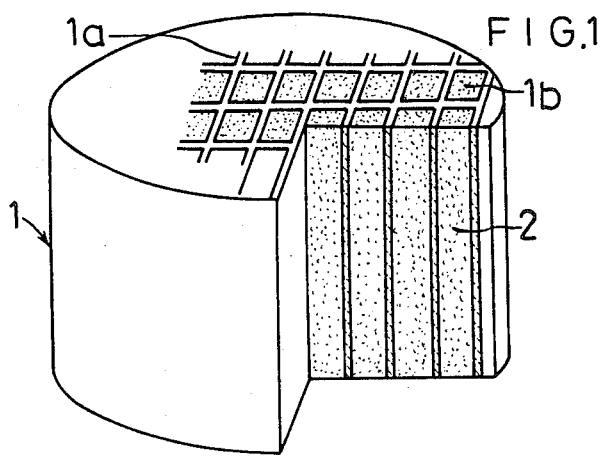
FIG. 1 is a partially cut away perspective view of a filter of a first embodiment of the present invention.

A filter for purifying the exhaust gas comprises a ceramic supporting member provided with at least one flow passage and porous ceramic filtering material which is charged within the flow passage and is integrally connected to the supporting member.

DETAILED DESCRIPTION OF THE INVENTION

Hereinafter, the present invention will be explained in detail in accordance with the embodiments shown in the drawings.

Referring now to FIG. 1, a supporting member 1 of a cordierite ceramic material has a cylindrical form with an outer diameter of 117 mm and a length of 80 mm. Within and integral with the supporting member 1 is a grid-shaped honeycomb structure having walls 1a with a thickness of 1 mm to provide a large number of square shaped straight flow passages 1b, one side of which has a width of about 10 mm.

Figure 2:
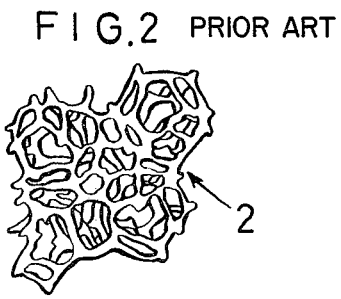
FIG. 2 is an enlarged view of a prior art porous ceramic filtering material to be charged within the filter of FIG. 1.

Cordierite porous ceramic filtering material 2 is charged within each of the flow passages 1b of the supporting member 1. As shown in FIG. 2 the porous ceramic material 2 has a three-dimensional network structure with continuous pores having a diameter of about 2 mm in order to impart good air permeability thereto.

One example of a method for producing an integral structure composed of the supporting member 1 and the porous ceramic filtering material 2 will be explained.

At first, cordierite powder, water and an organic binder are mixed with each other, extruded to form a supporting member 1 of a honeycomb structure, and dried.

Then, a sponge-like organic compound such as polyurethane foam with which is mixed a slurry produced by mixing a water solution composed of an organic binder such as methyl cellulose, ethyl cellulose and polyvinyl alcohol or a mixture thereof, and cordierite powder, is charged into the flow passages 1b of the supporting member 1. The supporting member 1 with the sponge-like organic compound and slurry charged therein then is dried at a temperature of 100° to 200° C. for 1 to 3 hours. After repeating the above charging and drying processes several times, the supporting member 1 with the organic compound and slurry therein are fired at a temperature of about 1300° to 1450° C. Consequently, a filter 3 for purifying exhaust gas is obtained wherein the slurry and compound are converted to a porous ceramic filtering material 2 integrally sintered to the walls of the passages 1b in the rigid supporting member.

In this case, a water solution of aluminum phosphate which is an inorganic binder can be used in place of the organic binder for producing the slurry.

The compression strength of the filter 3 which was produced by our inventors according to the method of the present invention was 250 to 350 kg/cm$^2$ in the axial direction thereof, 50 to 150 kg/cm$^2$ in the radial direction thereof and 10 to 30 kg/cm$^2$ in the oblique direction thereof.

Figure 3:
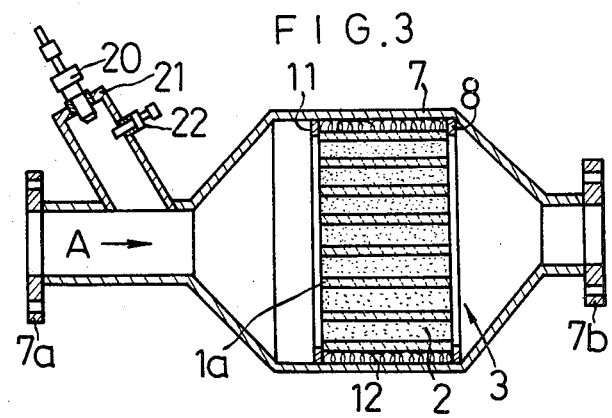
FIG. 3 and FIG. 4 are longitudinal sectioned views showing examples of the application of the filter of FIG. 1 respectively.
Figure 4:
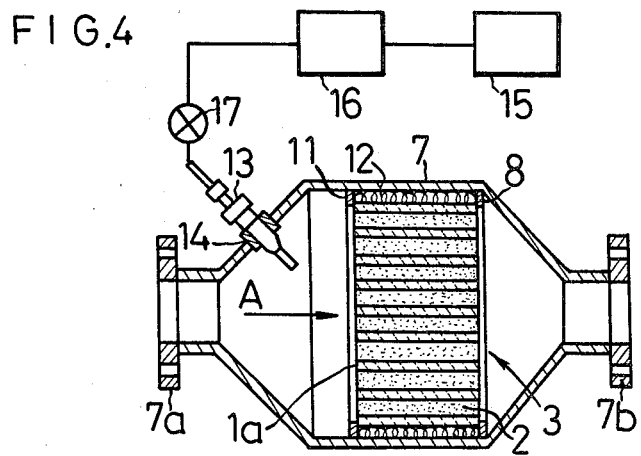

FIG. 3 and FIG. 4 show examples of the application of the filter 3. In each application, the filter is used for catching and collecting fine carbon particles in the exhaust gas which is discharged from a diesel engine or the like.

In FIG. 3, a cylindrical casing 7 is made of stainless steel and is fixed within the exhaust passage by means of flanges 7a and 7b. The exhaust gas flows in the direction of the arrow A. The outer peripheral surface of the filter 3 is retained by an elastic stainless steel wire net 12 and both ends of the filter 3 are fixed by ring stays 8 and 11 which are spot-welded to the casing 7. In the casing 7 on the upstream side thereof, a holder 21 provided with a small-sized burner 20 and a glow plug 22 is welded.

When exhaust gas containing fine carbon particles 5 flows within the casing 7, the fine carbon particles are caught and collected by means of the porous ceramic filtering material 2. And after a predetermined volume of the carbon particles are caught and collected, the small-sized burner 20 and the glow plug 22 operate to burn the caught carbon particles due to the burning heat of the burner 20. Consequently, the caught carbon particles are eliminated.

In the conventional filter composed of a ceramic honeycomb structure only, the catching rate or filtering efficiency of the fine carbon particles is only about 5% at maximum. In contrast, according to the structure of the present invention, a filtering efficiency of 60 to 70% can be obtained.

Since the porous ceramic filtering material 2 is integrally connected with the rigid supporting member 1 which has a greater mechanical strength than that of the porous ceramic 2, the mechanical strength of the whole filter can be improved largely as compared with the conventional filter composed only of a porous ceramic body.

Furthermore, since the filter of the present invention is made of ceramic, it is scarcely deteriorated even if it is directly exposed to the flame of the burner 20.

Therefore, the filter of the present invention can be used repeatedly for eliminating fine carbon particles from exhaust gas.

The filter 3 shown in FIG. 4 carries an oxidizing catalyst containing platinum.

For example, such an oxidizing catalyst can be impregnated into the material 2 by immersing the entire filter 3 of the present invention in a solution of platinous chloride and then firing the impregnated filter at a temperature of 500° to 1000° C. for 30 minutes.

A fuel injection nozzle 13 is screwed in a fitting 14 which is welded in the casing 7. The fuel is drawn from a fuel tank 15 by means of a fuel pump 16 and fed into the fuel injection nozzle 13 through a valve 17.

The fuel is injected into the interior of the casing 7, by means of the fuel injection nozzle 13. The injected fuel is oxidized and burned by means of the oxidizing catalyst. Due to the burning heat, the fine carbon particles caught and collected by the porous ceramic 2 of the filter 3 are burnt and eliminated.

In this example, since the fine carbon particles are burnt due to the burning heat of the injected fuel, even if the temperature of the flowing exhaust gas is not more than the temperature at which the fine carbon particles are burnt and eliminated, that is about 600° C. in experiment, the fine carbon particles can be sufficiently eliminated. For example, a temperature as low as about 300° C. will do.

The valve 17 operates to supply the fuel intermittently. For example, the valve 17 operates in combination with a key switch (not shown) and an accelerator pedal to stop the fuel supply when the engine is stopped and when the engine is operated at high load.

In this example, other catalysts may be used as an oxidizing catalyst in place of the platinum catalyst. For example, platinum-rhodium catalysts will do.

Furthermore, other fuel supplying means can be used in place of the fuel injection nozzle 13, if the fuel is supplied on the upstream side of the filter 3. As fuel for the nozzle 13, the same fuel as that supplied to the engine may be used.

In the foregoing examples, the cross section of the honeycomb structure supporting member 1 is circular and that of each open passages 1b is square.

Other shapes of the cross section of the supporting member 1 and the flow passages 1b will do. For example, the cross sectional shape of each flow passage may be formed into approximately a triangle by disposing some of the walls 1a radially.

The ceramic material, heat resistant material such as mullite and alumina may be used in place of cordierite.

Next, several other methods for producing the filter of the first embodiment, will be explained.

At first, a cordierite slurry which is mixed with a foaming agent is poured into the open passages 1b of the supporting member 1 and is foamed to provide a porous ceramic material to which is joined to the walls 1a of the supporting member 1.

The cordierite slurry mixed with the foaming agent is prepared as follows.

About 40 to 70 weight % of cordierite or mullite, about 60 to 30 weight % of a water solution containing 40% of aluminum phosphate as a binder, and not more than 0.1 weight % of a solution of phosphoric acid (hydrochloric acid, sulfuric acid or nitric acid will do) as a foaming promoting agent are filled within one vessel and mixed by stirring to form a cordierite slurry. Into the cordierite slurry, not more than 0.1 weight % of aluminum powder as a foaming agent (magnesium, iron or nickel powder will do) is added and mixed again to form a foaming slurry. When the prepared foaming slurry is poured into the open passages 1b of the supporting member 1, phosphoric acid reacts with the aluminum powder to be foamed while generating hydrogen gas.

Then, the foamed slurry expands to fill the interior of the open passages 1b of the supporting member 1, and the foamed slurry is joined to the walls 1a of the supporting member 1.

Next, the supporting member 1 to which a part of the foamed slurry is joined, is dried at a temperature of 100° to 200° C. and is fired at a temperature of 1300° to 1450° C. As a result, a filter 3 is obtained wherein the porous ceramic material 2 is joined to the walls 1a of the supporting member 1.

The obtained filter 3 is characterized by the strong joining of the supporting member 1 and the porous ceramic 2.

The following example is a method for producing filter structure, using slurry which is foamed by generating carbon dioxide gas.

Cordierite powder, a water solution of one of methyl cellulose, ethyl cellulose and polyvinyl alcohol as a viscous binder or a mixture thereof and a small amount of sodium hydrogen carbonate powder as a foaming agent are mixed together to form a slurry. Then, a water solution containing acid such as hydrochloric acid and nitric acid as a foaming promoting agent is added to the slurry and mixed again to form a foamable slurry.

When the foamable slurry is poured into the open passages 1b of the supporting member 1, the volume of the foamable slurry expands due to carbon dioxide gas which is generated when sodium hydrogen carbonate powder reacts with the acid and the expanded slurry is closely adhered to the walls 1a of the supporting member 1. Then, after being dried at a temperature of 100° to 200° C., the supporting member 1 to which the slurry is adhered is fired at a temperature of 1300° to 1450° C. Consequently, the filter 3 is obtained.

In the filter which was obtained by the above described method, the supporting member 1 and the porous ceramic 2 are strongly joined to each other.

Another method as described below is also possible.

The acid as a foaming promoting agent is mixed with the slurry within a pressurized vessel to form a foamable slurry. The foamable slurry is foamed when it is taken out of the pressurized vessel and the obtained foamed slurry is poured into the open passages 1b of the supporting member 1. Then, after being dried and fired, the filter is obtained.

Still another example of a method for producing a filter for purifying exhaust gas is composed of the steps of mixing cordierite powder, a water solution of one of methyl cellulose, ethyl cellulose and polyvinyl alcohol or a mixture thereof as an organic binder, a small amount of hydrochloric acid as a foaming promoting agent and a small amount of metallic powder as a foaming agent into a slurry, pouring the mixture into the open passages 1b of the supporting member 1 of the cordierite honeycomb structure to foam the same in place.

As a result, a filter of which walls 1a of the supporting member 1 and the porous ceramic 2 are integrally joined to each other is obtained. The obtained filter produced by the above method has also an excellent mechanical strength.

In the above described embodiments, the supporting member 1 is composed of a honeycomb structure. But, according to the present invention, the supporting member is not limited to the honeycomb structure.

Figure 5:
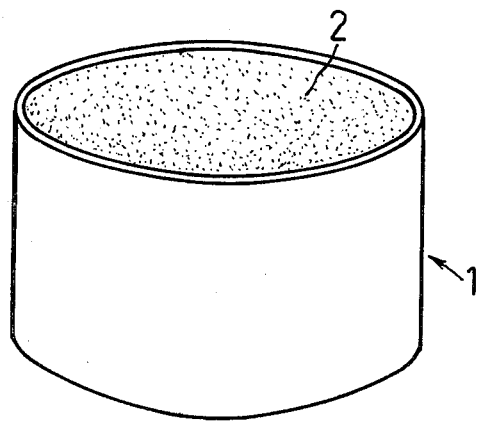
FIG. 5 is a perspective view of a second embodiment.

In the second embodiment shown in FIG. 5, the supporting member 1 is composed of a tubular body made of cordierite ceramic and the porous ceramic 2 is charged within the tubular supporting member 1.

Figure 6:
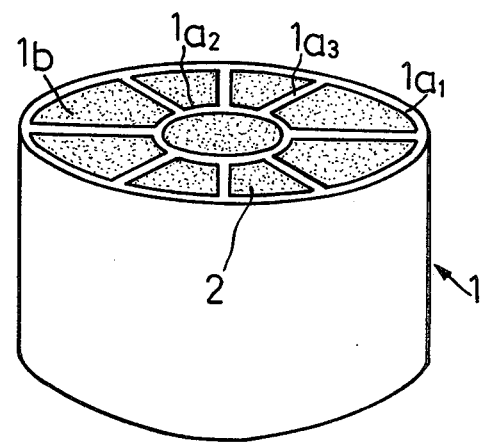
FIG. 6 is a perspective view of a third embodiment.

In the third embodiment shown in FIG. 6, the supporting member 1 made of cordierite ceramic is composed of concentric cylinders $1a_1$ and $1a_2$, and a plurality of radially extending walls $1a_3$ which connect the cylinders $1a_1$ and $1a_2$. The porous ceramic material 2 is charged within each open passage 1b which is defined by the cylinders $1a_1$ and $1a_2$ and the walls $1a_3$.

Furthermore, the method for joining the supporting member 1 and the porous ceramic 2 charged within the supporting member 1 is not limited to that as described in the above described first, second and third embodiments.

Figure 7:
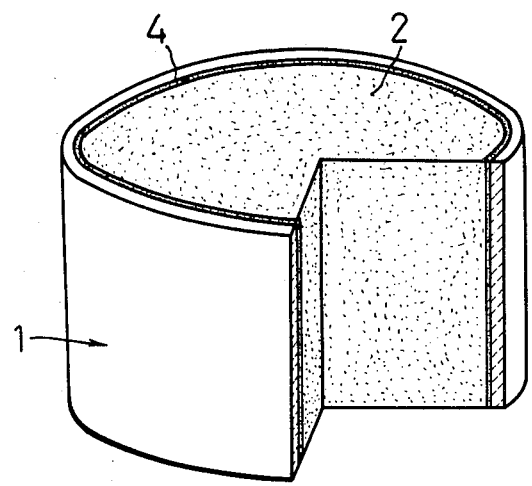
FIG. 7 is a partially cut away perspective view of a fourth embodiment.

In the fourth embodiment shown in FIG. 7, the supporting member 1 is composed of a cylindrical tubular body made of cordierite ceramic having an open flow passage. On the inner wall of the open passage cordierite ceramic slurry 4 is painted. Into the open passage there is inserted a porous ceramic body 2 which was fired and formed so as to have an outer diameter slightly smaller than that of the open passage. Then, the supporting member 1 is dried at a temperature of about 120° C. for about 2 hours and is fired further at a temperature of 1350° C. to 1450° C. for about 5 hours together with the porous ceramic body 2.

The slurry which was used in this embodiment was produced by mixing 100 g of cordierite fine powder, 7 g of methyl cellulose and 300 g of water.

In the filter which was produced by the above described method, the supporting member 1 and the porous ceramic body 2 are strongly joined to each other through the fired ceramic layer.

Figure 8:
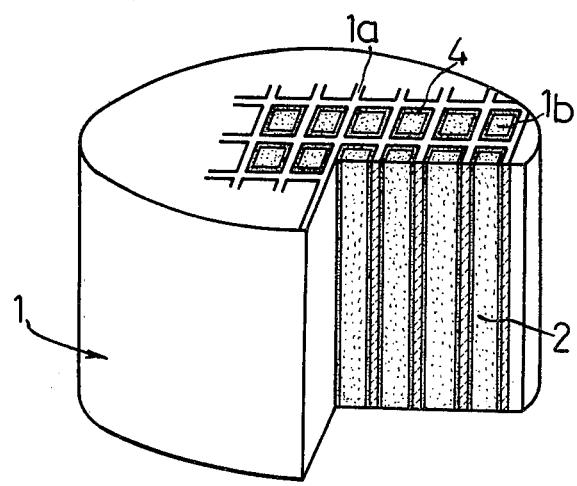
FIG. 8 is a partially cut away perspective view of a fifth embodiment.

The above described method can be applied to the case where the honeycomb like supporting member 1 is used as shown in FIG. 8.

In the fifth embodiment shown in FIG. 8, into each open passage 1b which is defined by the walls 1a, a fired porous ceramic body 2 is inserted. The porous ceramic body 2 is strongly joined to the walls 1a through the ceramic layer 4 which is obtained by firing the ceramic slurry.

Hereinafter, another effective method for producing a porous ceramic body which is suitable to be used in the filter of the present invention will be explained.

The effective method is characterized in that slurry, produced by mixing a solution of an organic solvent having lower viscosity than that of water and ceramic powder, is used as a ceramic slurry to be attached to the three dimensional organic compound.

According to this method, an unclogged fine porous ceramic filtering body having an excellent mechanical strength can be obtained.

The above described method for producing a porous ceramic body will be explained in detail.

At first, a solution of ethyl alcohol containing one of an organic binder such as polyvinyl butyral, and polyvinyl alcohol or a mixture thereof is mixed with cordierite powder to form a slurry. And a polyurethane foam composed of a network only having no oil film is immersed within the slurry. Then, the polyurethane foam is taken out from the slurry and excess slurry is removed by flowing 10 to 50 l of air per minute and per square centimeter. And after being dried at a temperature of 100° to 200° C. for 1 to 3 hours, the obtained polyurethane foam is subjected several times to the immersing and drying processes. Thereafter, the polyurethane foam is heated at a temperature of 1300° to 1450° C. to be sintered. As a result, a porous ceramic body as shown in FIG. 2 is obtained.

According to the above described method, a porous ceramic body having 900 meshes per square inch, about 200 mm of thickness and about 50 kg per square centimeter of mechanical strength can be obtained by three or four repetitions of the immersing process and the drying process.

The polyurethane foam composed of a network only can be obtained by a well known method. And a small amount of oil film can be removed by the well known water pressure method, ozone method, acid treatment method, heat treatment method or the like.

The organic solvent for dispersing cordierite to form a slurry is not limited to ethyl alcohol.

Other organic solvents having viscosity lower than water such as alcohols containing methyl alcohol, propil alcohol and butyl alcohol and ketons can be used. And ceramics other than cordierite can be used as ceramic powder.

Oil film is apt to be adhered to the surface of the polyurethane foam during the process of production.

According to the method of the present invention, such an oil film can be removed by the above described solvent so that the ceramic slurry is attached to the polyurethane foam with ease. And since the viscosity of the ceramic slurry is low, the polyurethane foam is not clogged with the ceramic slurry which is adhered thereto, even if the pores formed in the polyurethane foam are very minute.

And according to the method of the present invention, it is unnecessary to hydrolyze the polyurethane foam and to wash hydrolizing agent in water before adhering the ceramic slurry to the polyurethane foam. Therefore, the producing process can be made simple.

The three dimensional organic compound to which the ceramic slurry is adhered is not limited to polyurethane foam. For example, another organic compound in which fibers are entangled to form netted pores between fibers can be used. And the solution for producing the ceramic slurry is not limited to that of the above described solvent. Water can be used. In this case, it is preferable to make the water content not more than 50 weight % of the ceramic slurry.

As described above, the filter for purifying exhaust gas of the present invention has an excellent fine carbon particles filtering performance compared with the conventional honeycomb structured filter and also has a mechanical strength nearly equal to that of the conventional honeycomb structured filter.

Having now fully described the invention, it will be apparent to one of ordinary skill in the art that many changes and modifications can be made thereto without departing from the spirit or scope of the invention as set forth herein.

What is claimed is:

1. A filter for purifying exhaust gas of an internal combustion engine comprising:
   a rigid ceramic supporting member comprising at least one passage therethrough for flow of exhaust gas therethrough; and
   porous ceramic filtering material filling said at least one passage and sintered to the walls thereof.

2. A filter according to claim 1 wherein the supporting member is in the shape of a cylindrical body.

3. A filter according to claim 1 or 2 wherein the supporting member is of a honeycomb structure and said at least one passage comprises a plurality of flow passages.

4. A filter according to claim 1 or 2 wherein said at least one passage comprises a plurality of flow passages.

5. A filter according to claim 1 wherein the member comprises coaxial cylinders interconnected by radial webs and said at least one passage comprises a plurality of passages defined by said webs.

6. A filter according to claim 1 wherein the supporting member and filtering material are made of cordierite ceramic.

* * * * *